Jan. 16, 1968  H. BURGER  3,364,361
PISTON CONTROLLED IMPULSE GENERATING ARRANGEMENT
Filed Aug. 12, 1965  2 Sheets-Sheet 1
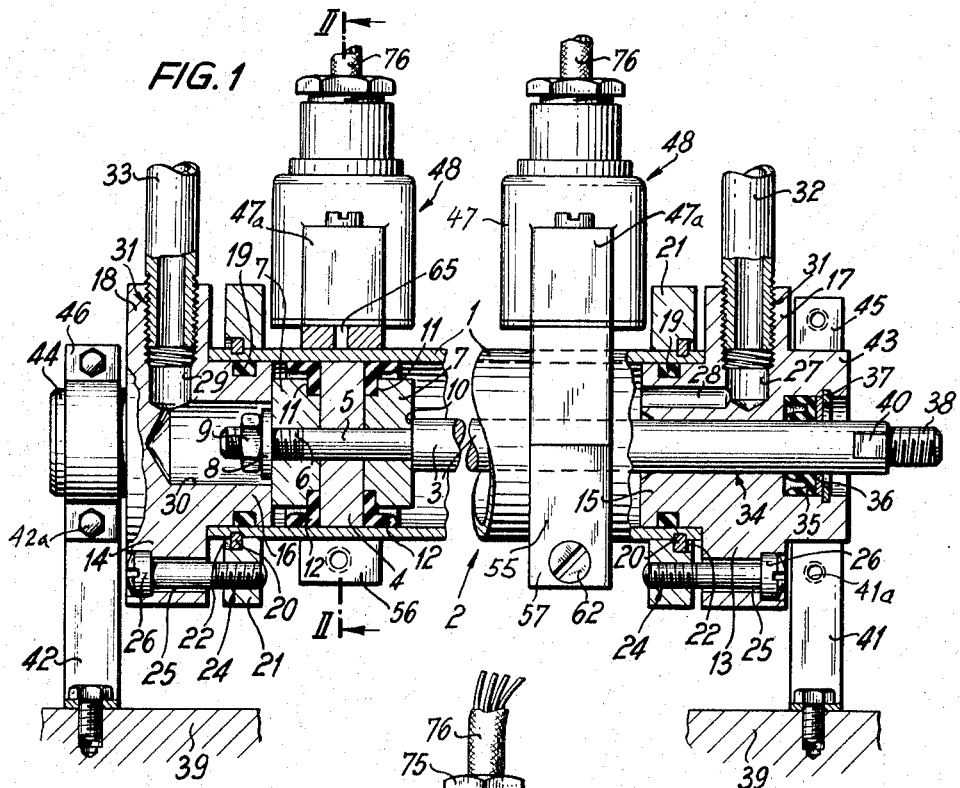
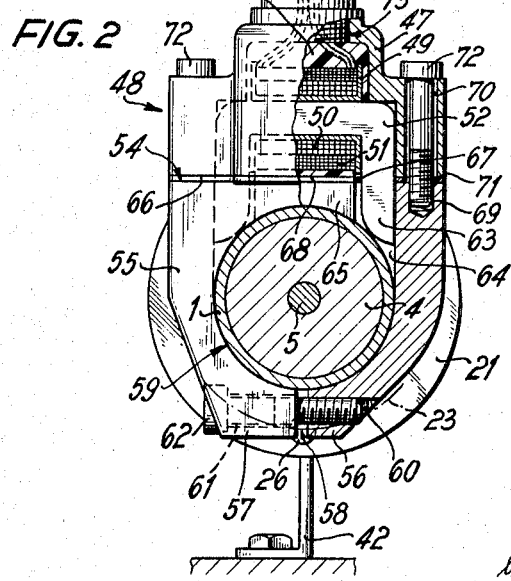
INVENTOR
Helmut Burger
by Michael S. Striker
Attorney Jan. 16, 1968   H. BURGER   3,364,361
PISTON CONTROLLED IMPULSE GENERATING ARRANGEMENT
Filed Aug. 12, 1965   2 Sheets-Sheet 2

INVENTOR
Helmut Burger
by Michael S. Striker
Attorney

The magnetic cores of impulse generators embrace a tubular non-magnetizable cylinder in which a magnetizable piston is reciprocable so that flux paths are formed when the piston is aligned with the cores whereby impulses are alternately produced in the impulse generators.

United States Patent Office 3,364,361
Patented Jan. 16, 1968

3,364,361
PISTON CONTROLLED IMPULSE GENERATING ARRANGEMENT
Helmut Burger, Esslingen, Germany, assignor to Robert Bosch G.m.b.H., Stuttgart, Germany
Filed Aug. 12, 1965, Ser. No. 479,194
Claims priority, application Germany, Aug. 17, 1964, B 78,129
14 Claims. (Cl. 290—1)

ABSTRACT OF THE DISCLOSURE

The magnetic cores of impulse generators embrace a tubular non-magnetizable cylinder in which a magnetizable piston is reciprocable so that flux paths are formed when the piston is aligned with the cores whereby impulses are alternately produced in the impulse generators.

Background of the invention

The present invention relates to an operation control apparatus, and more particularly to apparatus for controlling the movements of a pressure fluid operated piston driving a machine part.

The apparatus of the invention is particularly advantageously applied to machine tools for automatically controlling the performance of a sequence of operations. In each position of a control piston driving a first machine part an impulse is produced controlling the movements of another control piston driving a second machine part so that the machine parts operate sequentially.

Apparatus according to the prior art serving the same purpose provides limit switches operated by the pistons in end positions and controlling valves in the pressure conduits of the cylinders. Each limit switch has to be operated by a control rod operated by the piston and passing through the cylinder, which causes disturbances, particularly under operational conditions in which the apparatus is exposed to water or dust. Consequently, frequent replacement or servicing of the switches are necessary so that the same have to be mounted on an easily accessible place of the machine tool where they are protected from environmental hazards. While the mounting of the limit switches on the machine tool extends the span of life of the switches and improves the reliability of the operation, very long control rods, linkages and guide means for the same are required for connecting the limit switches with the control piston.

Summary of the invention

It is one object of the invention to overcome the disadvantages of control apparatus according to the prior art, and to provide a control apparatus producing electric control impulses in certain positions of a control piston.

Another object of the invention is to complete the flux path of an inductive impulse generator by a pressure fluid operated piston when the same assumes a certain position.

Another object of the invention is to provide on a control cylinder impulse generator means which produce impulses when a piston consisting of a magnetizable material assumes positions in the proximity of the impulse generator means.

Another object of the invention is to control a plurality of impulse generators by a plurality of reciprocating pistons so as to produce control impulses by which sequential reciprocating motions of the pistons are controlled.

Another object of the present invention is to provide control apparatus including cylinder and piston means which are not penetrated by control rods or other linkages or switches.

Another object of the invention is to eliminate linkages between a control piston and a switch.

With these objects in view, the present invention relates to control apparatus which is particularly suited for controlling successive operations of a machine tool. One embodiment of the invention comprises cylinder means, piston means mounted in the cylinder means for reciprocation and connected to a controlled machine part, and impulse generator means including means for producing a magnetic flux in close proximity of the cylinder means.

When the piston is in a position located in the region of the magnetic flux, it provides a path for the flux so that an electric impulse is produced by the impulse generator, which may consist of a magnetizable core and a winding on the same, or which may be a Hall generator.

In the preferred embodiment of the invention, the cylinder means include a non-magnetizable tubular part which is partly embraced by a U-shaped magnetizable core. The magnetic flux produced in the core by a winding energized by a source of voltage, is interrupted by the walls of the non-magnetizable tubular part, and by the pressure fluid in the same, as long as the piston is spaced from this region. When the piston is driven by pressure fluid to an operative position, a magnetizable part thereof is located within the tubular non-magnetizable part between the legs of the U-shaped magnetic core, so that the flux path is completed, and an impulse is produced in a second winding on the core of the impulse generator.

It is preferred to place two impulse generators axially spaced from each other on the tubular part, and to make the magnetizable part a portion of the piston, so that in the two end positions of the piston, one or the other impulse generator is actuated to produce an impulse.

It is advantageous to provide impulse generators and magnetic cores which are narrow in axial direction of the tubular cylinder part, and to construct the magnetizable part of the piston means as a circular plate sliding along the inner surface of the non-magnetizable tubular part of the cylinder means. In this manner, the operative position of the piston means is sharply defined, and the produced control impulse is of short duration.

Impulses produced by the impulse generators, are amplified in suitable amplifiers and supplied to storage devices which serve the purpose of storing impulses produced by one impulse generator until receiving an impulse from another generator. The amplifiers and storage devices, together with other elements of electric circuit are preferably placed in a separate casing. In the preferred embodiment, narrow impulse generators are detachably clamped to the tubular part of the cylinder means, so that the distance between the impulse generators can be adjusted in accordance with the desired length of stroke of the piston, and magnetizable part of the same. Narrow impulse generators can be closely spaced along the tubular cylinder part, and permit correspondingly short strokes of the piston means, and of the machine part operated by the same.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Description of the drawing

FIG. 1 is partly a side elevation, and partly an axial sectional view of an operation control apparatus according to the invention;

FIG. 2 is a cross-sectional view taken on line II—II in FIG. 1; and

*Description of the preferred embodiment*

Figure 3:
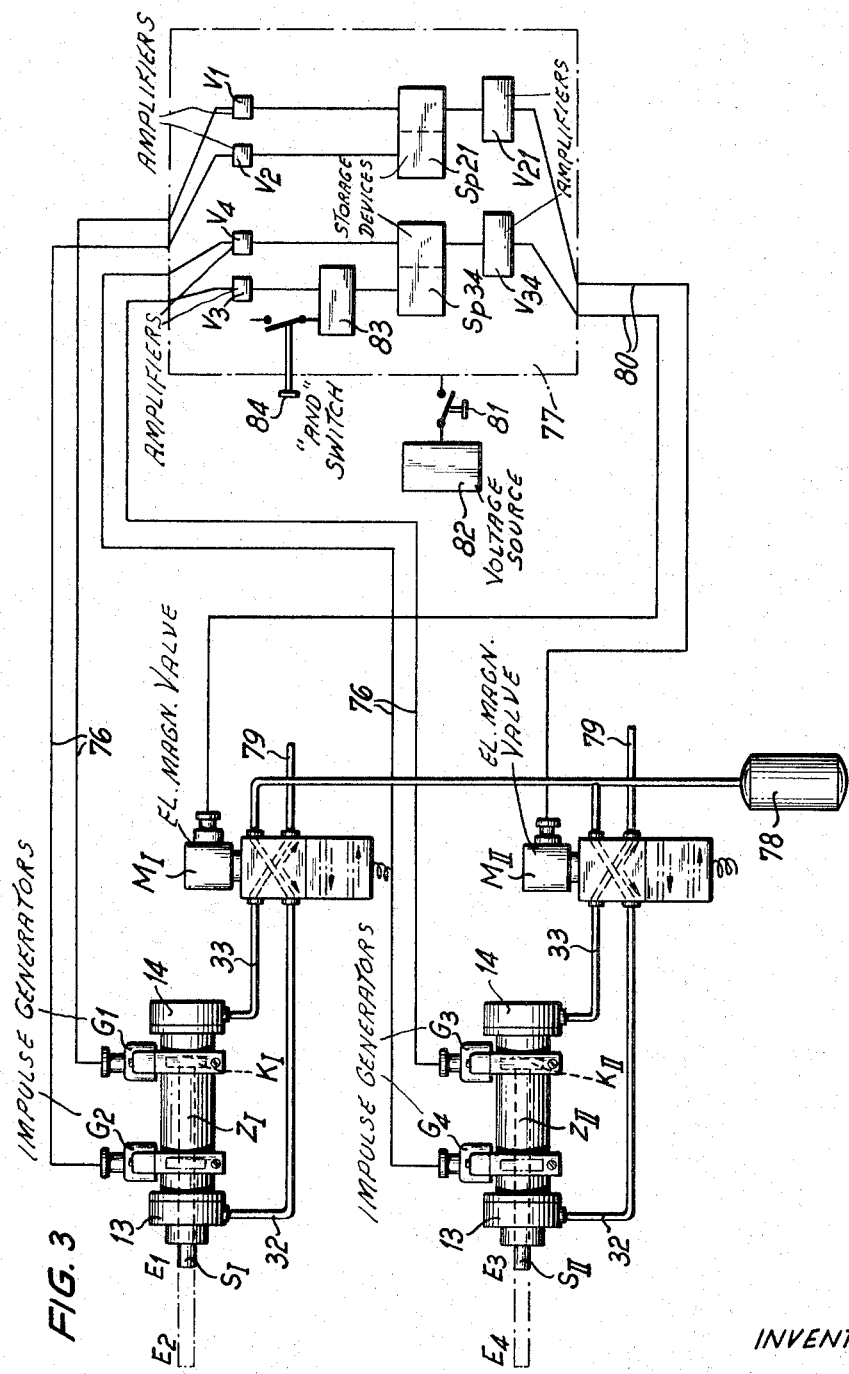
FIG. 3 is a schematic diagram illustrating the electric circuit and the hydraulic system of a pair of control apparatus performing sequential control operations.

Referring now to the drawings, and more particularly to FIGS. 1 and 2, a cylinder means generally indicated at 2, includes a tubular part 1 consisting of a non-magnetizable material, such as aluminum. End members 13 and 14 close the tubular part 1 and have central bosses 15, 16 projecting into the ends of tubular part 1, and radially projecting flanges 17, 18. Bosses 15, 16 have annular grooves in which sealing rings 19 are located. Flanges 17 and 18 abut against the end faces of the tubular part 1 and are held in this position by three screws 26 passing through bores 25 in flanges 17 and 18, and having threaded portions engaging threaded bores 24 in rings 21 which are secured to the ends of the tubular part 1 by pairs of half-rings 20 located in recesses 22 of rings 21 and in corresponding annular grooves in the outer surface of tubular part 1.

Each end member 13, 14 has a channel for the pressure fluid composed of two blind bores. The channel in end member 14 includes a bore 29 communicating with a conduit 33 which is threaded into a bore 31, and a central bore 30. End member 13 has a central bore 34 for a piston rod 3, and the blind bore 28 is provided parallel to the central bore 34 and ends in the blind bore 27 which communicates with the pressure conduit 32 which is threaded into a bore 31 of end member 15.

A sealing ring 35 is held by a washer 36 and a split ring 37 engaging a groove in end member 15. The end portion of piston rod 3 projects out of member 15, and has a threaded portion for securing a machine part, such as a tool slide, not shown, of a machine tool, whose casing is schematically indicated at 39. The flat faces 40 on the piston rod 3 prevent turning movement of the attached machine part.

Cylinder means 2 is secured to the casing of the machine tool 39 by a pair of supports 41. Each end member 13, 14 has a cylindrical projection 43, 44 embraced by arcuate brackets 45, 46 of supports 41, 42 whose legs are secured by screws to casing 39. The clamping brackets 45 and 46 of supports 41, 42 are pressed against projections 43, 44 by screws 41a, 42a.

Piston rod 3 has an end portion 5 of smaller diameter defining at one end an annular shoulder 10, and having at the other end a threaded portion 6. The end of the threaded portion 6, and a nut 9 and washer 8 thereon are located in the central blind bore 18 of end member 14.

A pair of clamping plates 7 and a piston part 4 are mounted on piston rod portion 5 and pressed against shoulder 10, and each other by nut 9. Piston part 4 has a cylindrical peripheral surface sliding on the inner surface of the non-magnetizable tubular part 1, and consists of a magnetizable material, for example iron. The clamping parts 7 consist of a non-magnetizable material, for example brass or aluminum, and have inner bosses abutting the side faces of piston part 4 and forming with the same annular recesses 11 in which sealing rings 12 are clamped. Sealing rings 12 have angular cross sections, and include cylindrical portions slidingly engaging the inner surface of tubular part 1 and being spaced from clamping parts 7 so that pressure fluid in the tubular cylinder part 1 presses the sealing rings 12 into a sealing position. Sealing rings 12 may consist of leather, rubber, or any other flexible non-magnetizable material. When nut 9 is removed from the threaded portion 6, the piston means can be taken apart and again assembled with new sealing rings.

The piston means has two terminal positions in which one of clamping members 7 abuts end members 13 or 14. Pressure fluid supplied to conduit means 32 will cause movement of the piston means to the illustrated position while fluid on the left side of the piston means is discharged through channel 30, 29 and conduit means 33. When a valve means reverses the flow of pressure fluid, as will be explained hereinafter with reference to FIG. 3, pressure fluid enters through conduit means 33 and drives the piston means to the other end position while the fluid on the right side of the piston means is discharged through channel 28, 27 and conduit means 32.

A pair of impulse generators 48 is mounted on cylinder means 2, and more particularly near the ends of the non-magnetizable tubular parts 1 in planes defined by piston parts 4 in the two end positions of the piston means. As best seen in FIG. 2, each impulse generator 48 has a casing 47 forming a stepped cavity in which a U-shaped magnetizable core 52 is located. The yoke of core 52 is surrounded by an insulating body 49 on which an inner winding 50 and an outer winding 51 are mounted. The ends of the windings are connected to four conductors forming a cable 76 which passes through a bushing 74 and is secured by a threaded member 75. The cavity of casing 47 is filled with a cast and hardened synthetic material 53 so that all parts are held in position. Casing 47 has narrow lateral portions 47a provided with bores 70 through which screws 72 pass into corresponding threaded bores 69 of a clamping means 55 which surrounds tubular part 1, engaging the outer surface of the same with the inner surface 59. Clamping means 55 is as narrow as the lateral casing portions 47a, and has end portions 56, 57 separated by a slot 58 and resiliently pressed together by a screw 62 passing through a bore 61 in portion 57 into a threaded bore 60 in portion 56. By operation of screw 62, tubular part 1 is clamped by clamping means 55, and casing 47 of each impulse generator 48 is detachably secured to tubular part 1, permitting an axial adjustment of the impulse generators along tubular part 1. Clamping means 55 and casing 47, 47a consist of a non-magnetizable material, for example, aluminum or brass. A thin aluminum sheet 66 is located between each casing 47 and the corresponding clamping means 55 to close the cavity in casing 47.

The axis of windings 50, 51 and the yoke of core 52 extend perpendicularly to the axis of the cylindrical surface 59 and to tubular part 1.

The legs 63 of the magnetic core 52 project through openings 67 in the thin sheet 66 into a corresponding pair of bores 64 in clamping means 55. Bores 64 open on the cylindrical surface 59 of clamping means 55 so that the curved end faces of legs 63 are spaced 0.1 to 0.2 mm. from the outer surface of the tubular part 1. This space is provided to prevent any damage to tubular part 1 by the legs 63 when casing 47 is secured by screws 72 to clamping means 55. Due to the curved shape of the ends of the legs 63, the impulse generator can be mounted by different clamping means on tubular parts of different diameter than illustrated and nevertheless portions of the curved end faces will extend substantially parallel to the outer cylindrical surface of the respective tubular part 2.

A narrow slit 65 connects bores 64, and prevents the formation of Eddy currents in the respective portion of clamping means 55 between the legs 63 of the magnetic core 52. Sheet 66 has a corresponding slit 68 connecting openings 67.

The outer winding 51 has a substantially greater number of windings than the inner winding 50 and the diameter of the wire of the inner winding 50 is a multiple of the diameter of the wire of the outer winding 51. The inner winding 50 is connected to a source of voltage by two conductors of cable 76, and since windings 50, 51 are magnetically connected by core 52, a voltage is induced in the outer winding 51 when an alternating current flows through the inner winding 50. The induced voltage is proportional to the magnetic flux produced by the inner winding and passing through the outer winding. Since the magnetic flux is in the reverse proportion to the magnetic resistance, the voltage induced in the outer winding 51 depends on the magnetic resistance of the flux path between the ends of the legs 63 of core 52.

As long as during the reciprocation of the piston means, the magnetizable piston part 4 is located in the non-magnetizable tubular part 1 spaced in axial direction from an impulse generator 48 and more particularly from the magnetic core 52, 63, the magnetic resistance of the two wall portions of the non-magnetizable tubular part 1 adjacent legs 63, and of the fluid filled cylinder chamber within the same, is high, and substantially equal to the magnetic resistance of a corresponding air gap. Therefore, the magnetic flux produced by the primary winding 50 is small, the stray flux great, and the magnetic coupling between windings 50, 51 has a low efficiency.

However, when the magnetizable piston part 4, which preferably consists of iron, assumes a position located between the legs 63, separated from the same only by the wall of tubular part 1, a path for the magnetic flux is provided which has low magnetic resistance, the remaining gap being constituted substantially by two wall portions of tubular part 1 located adjacent the ends of the legs 63. Since the magnetic resistance is very low, the magnetic flux, and the voltage or potential induced in the secondary winding 51 is correspondingly large, while the stray flux is small.

The substantial increase of the voltage produced in the secondary winding 51 in the terminal positions of the piston means constitutes an impulse or signal, which is supplied to an electric circuit for controlling electromagnetically operated valve means controlling the flow of pressure fluid to another operation control apparatus of the type described with reference to FIGS. 1 and 2.

By way of example, an electric circuit, and a conduit system for two control devices according to the present invention for operating two machine parts in a predetermined sequence will now be described with reference to FIG. 3.

A first control apparatus $Z_I$ and a second control apparatus $Z_{II}$ are provided, each apparatus being constructed as described with reference to FIGS. 1 and 2. Apparatus $Z_I$ has two impulse generators $G_I$ and $G_{II}$ and apparatus $Z_{II}$ has two impulse generators $G_3$ and $G_4$. Ends $S_I$ and $S_{II}$ of piston rods 3 project out of the cylinder means and are connected to tool slides of a machine tool, not shown. The piston rods carry pistons $K_I$ and $K_{II}$ each including a magnetizable piston part 4. The piston means are to be operated in a sequence of four strokes, as follows:

(1) Advance of piston $K_I$ to the left,
(2) Advance of piston $K_{II}$ to the left,
(3) Return of piston $K_I$ to the right, and
(4) Return of piston $K_{II}$ to the right.

In the rear terminal positions on the right as viewed in FIG. 3, the pistons and piston rods are shown in broken lines, and in the forward terminal position on the left as viewed in FIG. 3, pistons and piston rods are indicated by dash and dot lines. The piston rods $S_I$ and $S_{II}$ have terminal positions $E_1$, $E_2$ and $E_3$, $E_4$, respectively.

The flow of pressure fluid to and from the devices $Z_I$, $Z_{II}$ is controlled by electromagnetically operated valve means $M_I$, $M_{II}$. The boxes below the valve means $M_I$ and $M_{II}$ indicate the two positions of each valve. In the normal position of each valve which is obtained by the pressure of a spring, not shown, a pressure conduit from a source of pressure fluid 78 is connected with conduits 32 so that the piston is driven to the right, and the discharge conduits 33 are connected by the valve means to the discharge conduits 79. When the electromagnetic means of the valves are energized, the position indicated by dash and dot arrows in the lower boxes is obtained, in which the flow of pressure fluid is reversed, so that the pistons are driven to the left and fluid is discharged through conduits 32 and 79.

In the normal position of valve means $M_I$ and $M_{II}$, pistons $K_I$ and $K_{II}$ are located on the right of the tubular part 1, or are driven toward the right in a return stroke. The pressure fluid is preferably compressed air.

Each of the impulse generators $G_I$ to $G_{IV}$ is connected by conductors forming a cable 76 to a casing 77 in which electric devices are located. A source of voltage 82 is connected by main switch 81 to a conductor which is connected with one terminal of a manually operated switch 84 which is connected to an "AND" switch 83. The four conductors 76 are respectively connected with four amplifiers $V_I$, $V_{II}$, $V_{III}$ and $V_{IV}$ by which the impulses produced by the impulse generators are amplified.

Amplifier $V_I$ and $V_{II}$ are connected to the two halves of a storage device $Sp$ 21 and the amplifiers $V_{III}$ and $V_{IV}$ are connected with the two halves of a storage device $Sp$ 34. However, amplifier $V_{III}$ is connected with the corresponding half of the storage device $Sp$ 34 through the "AND" switch 83. The halves of the storage devices connected to amplifiers $V_I$ and $V_{IV}$ are connected to second amplifiers $V_{21}$ and $V_{34}$ which are respectively connected to electromagnetically operated valve means $M_{II}$ and $M_I$.

The "AND" switch 83 produces a signal at its output only when two impulses simultaneously appear at its two inputs. Therefore, an impulse from impulse generator $G_3$ amplified by amplifier $V_3$ will reach storage device $Sp$ 34 only if switches 81 and 84 are closed.

The storage devices may be provided with relays, or transistor units, and serve the purpose to store an impulse introduced into the respective input half until an impulse is introduced into the other input half, whereupon the stored signal is transmitted to the amplifiers $V_{21}$ or $V_{34}$ respectively, which amplify the impulses sufficiently to permit operation of the electromagnetic valve means.

When the main switch 81 is closed, the circuit in casing 77 is energized, and the primary windings 50 of the impulse generators $G_1$, $G_4$ are energized by the other two conductors, not shown in FIG. 3, of the respective cables 76. Switch 84 is also connected to the voltage.

As long as starting switch 84 is open, the valves $M_I$, $M_{II}$ are held in a normal position of rest by springs, not shown, so that conduits 32, 33, 79 are connected by the valve means as indicated by the crossing arrows. Pistons $K_I$ and $K_{II}$ are in their rear end positions indicated in broken lines on the right of the cylinder means, as viewed in FIG. 3.

In these terminal positions of the pistons, the secondary windings 51 of the impulse generators $G_1$ and $G_3$ have produced an impulse so that when main switch 81 is closed, an impulse produced by impulse generator $G_1$ is transmitted to amplifier $V_1$ and supplied to storage device $Sp$ 21 which impulse clears storage device $Sp$ 21 so that electromagnetically operated valve means $M_I$ in the event that it was previously energized, is returned to its normal position of rest by the spring thereof. In FIG. 3, it is assumed that electromagnetically operated valve means $M_{II}$ is already in the normal position of rest so that the clearing signal has no effect. The impulse produced by impulse generator $G_3$ cannot be introduced into the storage device $Sp$ 34, since the "AND" switch 83 is still open.

The desired sequence of operations is started by closing start switch 84, so that the impulse produced by impulse generator $G_3$, amplified by amplifier $V_3$ is supplied to storage device $Sp$ 34, whereupon it is amplified by amplifier $V_{34}$ and shifts the valve means $M_I$ out of its position of rest to the other position, holding the valve in this position until a clearing impulse is introduced into storage device $Sp$ 34 by impulse generator $G_4$ which takes place later as will be described hereinafter.

After the valve means $M_I$ has been shifted, cylinder means $Z_I$ receives pressure air in its right hand chamber so that piston $K_I$ starts its forward stroke, while piston $K_{II}$ remains in its right terminal position. As soon as piston $K_I$ reaches its forward terminal position on the left as viewed in FIG. 3, piston part 4 produced an impulse in impulse generator $G_2$ which is supplied through amplifier $V_2$ to storage device $Sp$ 21, further amplified by amplifier $V_{21}$ and supplied to valve means $M_{II}$ to energize the same whereby the valve means is shifted to its other position and magnetically held in this position until storage device $Sp$ 21 receives from impulse generator $G_1$ a clearing signal later on.

When valve means $M_{II}$ is shifted, to the position indicated by dash and dot arrows, compressed air is supplied to the rear portion of cylinder $Z_{II}$ so that the second operation of the sequence is started, since piston $K_{II}$ starts its forward stroke, while piston $K_I$ remains in its forward end position on the left as viewed in FIG. 3.

When at the end of its forward stroke, piston $K_{II}$ is aligned with impulse generator $G_4$, piston part 4 produces an impulse in impulse generator $G_4$ which is supplied through amplifier $V_4$ to the storage device $Sp$ 34 so that the previously stored signal of ampulse generator $G_3$ is cleared. The valve means $M_I$ is no longer held in the displaced position by magnetic forces so that the spring of the valve means is effected to return the valve means to the normal position of rest where it remains until later on an impulse supplied by impulse generator $G_3$ to storage device $Sp$ 34.

When the valve means $M_I$ is in the normal position of rest illustrated by crossed arrows, the left chamber portion of cylinder $Z_I$ receives compressed air so that the third operation starts, and piston $K_I$ starts its return stroke, while piston $K_I$ remains in its forward end position. When piston $K_I$ reaches its rear end position on the right it causes impulse generator $G_1$ to produce an impulse which is amplified by amplifier $V_1$, supplied to the storage device $Sp$ 21 to extinguish the previously stored impulse of impulse generator $G_2$ so that storage device $Sp$ 21 is cleared. The valve means $M_{II}$ is no longer energized and, its spring returns the valve means to the normal position of rest indicated by crossed arrows where the valve means remains until storage device $Sp$ 21 receives, later on, another impulse from impulse generator $G_2$.

When valve means $M_{II}$ is in its position of rest, the forwardly located chamber of cylinder $Z_{II}$ receives compressed air, so that the fourth operation starts and piston $K_I$ starts its return stroke, while piston $K_I$ remains in its previous position. At the end of the fourth operation, piston $K_{II}$ reaches its rear end position, causes impulse generator $G_3$ to produce an impulse which is supplied through amplifier $V_3$ to storage device $Sp$ 34, so that the valve means $M_I$ is shifted out of its normal position to the position indicated by dash and dot arrows. After valve means $M_I$ has been shifted by magnetic forces and it is held in the displaced position by the same, the first operation of the next sequence of operations is started, if start switch 84 is still closed. However, if start switch 84 is open, the "AND" switch 83 prevents the impulse produced by impulse generator $G_3$ at the end of the fourth operation to reach storage device $Sp$ 34 and valve means $M_I$, so that the latter remains in its normal position, and piston $K_I$ stays in its rear end position, which was previously assumed by piston $K_I$ so that the initial position shown in FIG. 3 is again obtained.

Inductive impulse generators have been described with reference to FIG. 2, but it will be understood that other impulse generators responsive to flux variations may also be used, for example Hall generators may be substituted for the impulse generators described above.

It will be understood that each of the elements described above, or two or more together, may also find a useful application in other types of operation control apparatus for moving parts of a machine in a desired sequence, differing from the types described above.

While the invention has been illustrated and described as embodied in apparatus including a non-magnetizable cylinder and a magnetizable piston cooperating with an impulse generator by varying the magnetic flux of the same, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an operation control apparatus, in combination, cylinder means including a non-magnetizable tubular part; impulse generator means mounted outside of said cylinder means and including a U-shaped magnetic core having a pair of legs having ends in close proximity with the outer surface of said tubular part, first winding means on said core for producing a magnetic flux in the same, and second winding means on said core for producing an impulse upon variation of the flux in said core; and piston means mounted in said cylinder means for reciprocation, and including a magnetizable piston part slidable on the inner surface of said tubular part between an inoperative position spaced from said impulse generator means in axial direction of said cylinder means, and an operative position located in said tubular part in the region of said impulse generator means for providing a flux path for said impulse generator means whereby the air gap of said core is reduced to substantially twice the wall thickness of said tubular part so that an impulse is produced in said second winding means.

2. An apparatus as set forth in claim 1 and including clamping means for detachably attaching said influx generator means to said tubular part.

3. An apparatus as set forth in claim 1 wherein said first and second winding means have different numbers of windings and wherein said first winding means is adapted to be connected to a source of voltage.

4. An apparatus as set forth in claim 1 wherein said impulse generator means includes a casing in which said winding means and said core are located, and a synthetic material filling said casing; and comprising a bushing attached to said casing; a cable including a plurality of conductors connected with said winding means and secured by said bushing to said casing; a narrow clamping means detachably secured to said tubular part; and means for securing said casing to said clamping means, said casing and said clamping means being made of a non-magnetizable material.

5. An apparatus as set forth in claim 1 wherein said piston part is a circular disc having a center opening; and wherein said piston means includes a piston rod adapted to be connected to a machine part to be operated and having a portion passing through said center opening; a pair of sealing rings consisting of a non-magnetizable material slidingly engaging the inner surface of said tubular part and located on opposite sides of said piston part; and a pair of clamping plates for pressing said sealing rings against said piston part.

6. An apparatus as set forth in claim 5 wherein each of said sealing rings has an angular cross section and includes a first annular portion abutting said piston part and a second annular portion sliding on said tubular part; wherein said clamping plates have annular recesses for receiving said first portions while said second portions are pressed against said tubular part by pressure fluid in said cylinder means.

7. In an impulse generating control apparatus, in combination, cylinder means including a non-magnetizable tubular cylinder having an axis; at least one inductive impulse generator means mounted on said cylinder means and including magnetizable means located between the ends of said tubular cylinder in a plane transverse to said axis in close proximity to the outer surface of said tubular cylinder for producing a magnetic flux passing through said tubular cylinder in said plane; and fluid operated piston means mounted in said tubular cylinder for reciprocation, and including a magnetizable part movable in said tubular cylinder between an inoperative position spaced from said magnetizable means in axial direction of said tubular cylinder, and an operative position located in said plane axially aligned with said magnetizable means for providing a flux path for said impulse generator means whereby the same produces an impulse.

8. Apparatus as claimed in claim 7 and comprising clamping means for clamping said impulse generator means to said tubular cylinder so that the axial position of said magnetizable means can be adjusted.

9. Apparatus as claimed in claim 8 wherein said magnetizable means of said impulse generator means are narrow in axial direction of said tubular cylinder.

10. Apparatus as claimed in claim 7 wherein said impulse generator means includes at least one induction winding, wherein said magnetizable means include a U-shaped magnetizable core having a yoke surrounded by said winding and a pair of legs located in said plane having free ends in close proximity with the outer surface of said tubular cylinder; and wherein said magnetizable part of said piston means has a peripheral surface in contact with the inner surface of said tubular cylinder so that in said operative position of said piston means, the air gap of said core is reduced to substantially twice the wall thickness of said tubular cylinder.

11. In an impulse generating control apparatus, in combination, cylinder means including a non-magnetizable tubular cylinder having an axis; at least one inductive impulse generator means mounted on said cylinder means and including magnetizable means located between the ends of said tubular cylinder in a plane tranverse to said axis in close proximity to the outer surface of said tubular cylinder, and winding means for producing a magnetic flux passing through said tubular cylinder in said plane; and fluid operated piston means mounted in said tubular cylinder for reciprocation, and including a magnetizable part movable in said tubular cylinder between an inoperative position spaced from said magnetizable means in axial direction of said tubular cylinder, and an operative position located in said plane axially aligned with said magnetizable means for providing a flux path for said impulse generator means whereby an impulse is produced in said winding means in said operative position of said magnetizable part.

12. In an impulse generating control apparatus, in combination, cylinder means including a non-magnetizable tubular cylider having an axis; at least one inductive impulse generator means mounted on said cylinder means and including magnetizable means located between the ends of said tubular cylinder in a plane tranverse to said axis in close proximity to the outer surface of said tubular cylinder, an energized winding for producing a magnetic flux passing through said tubular cylinder in said plane, and an inductive winding; and fluid operated piston means mounted in said tubular cylinder for reciprocation, and including a magnetizable part movable in said tubular cylinder between an inoperative position spaced from said magnetizable means in axial direction of said tubular cylinder, and an operative position located in said plane axially aligned with said magnetizable means for providing a flux path for said impulse generator means whereby an impulse is produced in said inductive winding.

13. In an impulse generating control apparatus, in combination, cylinder means including a non-magnetizable tubular cylinder having an axis; a pair of inductive impulse generator means mounted on said cylinder means and including magnetizable means located between the ends of said tubular cylinder in planes transverse to said axis and spaced along said tubular cylinder and in close proximity to the outer surface of said tubular cylinder for producing a magnetic flux passing through said tubular cylinder in said plane; and fluid operated piston means mounted in said tubular cylinder for reciprocation, and including a magnetizable part movable in said tubular cylinder between an inoperative position spaced from said magnetizable means in axial direction of said tubular cylinder, and two operative positions respectively located in said planes axially aligned, respectively, with said magnetizable means of said two impulse generator means for alternately providing flux paths for said impulse generator means whereby the same alternately produce impulses.

14. In an operation control apparatus, in combination, cylinder means including a non-magnetizable tubular part; a pair of impulse generator means mounted outside of said cylinder means spaced along said tubular part, each impulse generator means including means for producing magnetic flux in close proximity with said tubular part, each impulse generator means including a U-shaped magnetic core having a pair of legs having ends in close proximity with the outer surface of said tubular part, first winding means on said core for producing a magnetic flux in the same, and second winding means on said core for producing an impulse upon variation of the flux in said core; and piston means mounted in said cylinder means for reciprocation, and including a magnetizable part movable in said tubular part between two positions respectively located in the regions of said impulse generator means for alternately providing a flux path for one or the other of said impulse generator means during reciprocation whereby said impulse generator means alternately produce impulses.

References Cited

UNITED STATES PATENTS

| | | | |
|---|---|---|---|
| 2,604,079 | 7/1952 | Ray | 92—275 |
| 2,627,183 | 2/1953 | Greenwood et al. | 92—5 |
| 2,803,110 | 8/1957 | Chittenden | 91—275 |
| 2,842,688 | 7/1958 | Martin | 310—15 |
| 2,922,971 | 1/1960 | Jeglum | 92—5 |
| 3,024,374 | 3/1962 | Stauder | 310—30 |
| 3,160,836 | 12/1964 | Farley | 92—5 |
| 3,259,769 | 7/1966 | Stott | 310—15 |

EDGAR W. GEOGHEGAN, *Primary Examiner.*

P. E. MASLOUSKY, *Assistant Examiner.*